(12) United States Patent  
Reichert et al.

(10) Patent No.: US 7,423,421 B2
(45) Date of Patent: Sep. 9, 2008

(54) DEVICE FOR SENSING A DISPLACEMENT FOR A LINEAR DRIVE, AND LINEAR DRIVE

(75) Inventors: Uwe Reichert, Schlüchtern (DE); Jürgen Schrepfer, Hünstetten (DE); Ralf Sablotny, Bad Soden-Salmünster (DE); Stephan Thomas, Bad Soden-Salmünster (DE); Christoph Engel, Bad Orb (DE)

(73) Assignee: WOCO Industrietechnik GmbH, Bad Soden-Salmünster (DE)

( * ) Notice: Subject to any disclaimer, the term of this patent is extended or adjusted under 35 U.S.C. 154(b) by 76 days.

(21) Appl. No.: 11/357,433

(22) Filed: Feb. 17, 2006

(65) Prior Publication Data

US 2006/0208724 A1     Sep. 21, 2006

(30) Foreign Application Priority Data

Feb. 18, 2005     (DE) ................ 10 2005 007 561

(51) Int. Cl.
*G01B 7/14*     (2006.01)
*G01R 33/06*     (2006.01)

(52) U.S. Cl. ................ 324/207.24; 324/207.2

(58) Field of Classification Search ............ 324/207.24, 324/207.13, 207.25, 207.2, 207.22; 310/26, 310/12, 90.5, 90, 80, 46; 318/135
See application file for complete search history.

(56) References Cited

U.S. PATENT DOCUMENTS

| 5,568,760 A | 10/1996 | Volzer |
| 5,570,015 A | 10/1996 | Takaishi et al. |
| 6,854,335 B1 * | 2/2005 | Burns .......................... 73/728 |

FOREIGN PATENT DOCUMENTS

| DE | 43 03 403 A1 | 8/1993 |
| DE | 196 24 233 C1 | 10/1997 |

* cited by examiner

*Primary Examiner*—Reena Aurora
(74) *Attorney, Agent, or Firm*—Christensen O'Connor Johnson Kindness PLLC

(57) ABSTRACT

A device for sensing the linear axial displacement of an actuator comprises, in one embodiment, a movable, elongated magnet coupled to the actuator and a fixed Hall sensor. A one-dimensional bearing for the magnet is designed to receive bearing forces in a direction radial to the axial direction by permitting a displacement and pivoting movement of the magnet around the one-dimensional bearing. Arranging the Hall sensor in the region of the one-dimensional bearing ensures that the spacing or gap between the magnet and the Hall sensor remains constant, even in case of a pivoting and/or radial movement of the actuator and of the magnet connected thereto along the full length of displacement of the actuator. Accordingly, the results in sensing the linear displacement of the actuator are not adversely affected by admissible deflections of the actuator from the axial direction of linear displacement.

20 Claims, 3 Drawing Sheets

DEVICE FOR SENSING A DISPLACEMENT FOR A LINEAR DRIVE, AND LINEAR DRIVE

BACKGROUND

The invention relates to a device for sensing a displacement or to a linear displacement sensor for a linear drive displacing an actuator such as an actuator rod substantially linearly, mainly in its axial direction. Linear drives are used particularly for controlling a positioner such as a turbocharger, a turbobrake, a valve or the like.

Such devices or displacement sensors are known to be integrated particularly in pneumatic linear drives such as aneroid capsules or pressure cans. Known from published German patent application DE 43 03 403 A1 is a pneumatic linear drive, the pneumatic working chamber of which is defined in part by a diaphragm stiffened by a disc. When the working chamber is exposed to a vacuum, the volume of the working chamber is reduced and the diaphragm, together with the stiffening disc, is displaced. The actuator secured to the stiffening disc exerts a corresponding actuation response for controlling the positioner. A bar magnet accommodated in the actuator is displaced relative to a fixed magnet sensor during positioning. The magnet sensor senses the position of the actuator from the change in the magnetic field and relays a displacement signal to a corresponding controller. A similar configuration of a linear displacement sensor is known from German patent application DE 196 24 233 C1.

In many positioners, such as turbochargers or turbobrakes, operating forces occur having radial direction components as regards the axial direction of displacement of the actuator. These radial force components are evident by a drift in the parts of the positioner from their displacement path and are transferred to the actuator of the linear drive which consequently results in a departure of the actuator from its linear displacement path. Known displacement sensor systems have problems in that they either prove unsuitable for such positioners as turbochargers because of the actuator guidance being too rigid or the results of sensed displacement of the actuator differ markedly from the true displacement because of strong radial force components of the positioner. This distortion in the displacement sensings can greatly detriment positional control.

SUMMARY

An object of the present disclosure is to overcome the disadvantages of the prior art, in one embodiment by providing a device for sensing a displacement, such as a linear displacement sensor for a linear drive, including a pneumatic linear drive, with which the results in sensing the linear displacement of the actuator are not adversely affected by an admissible deflection of the actuator from the axial direction of linear displacement.

According to one embodiment, a device for sensing the linear displacement of an actuator axially comprises a movable, elongated magnet and a fixed Hall sensor, the magnet being coupled to the actuator for moving in accordance to an actuation of the actuator. In accordance with this embodiment, the device comprises a one-dimensional bearing for the magnet. The one-dimensional bearing is designed to receive the bearing forces in a direction radial to the axial direction by permitting a displacement and pivoting movement of the magnet around the one-dimensional bearing. In this arrangement, the one-dimensional bearing is intended to receive exclusively radial forces by permitting any pivoting movement about the bearing location, for example in a conical pivoting range of up to 15°, or in other embodiments preferably up to 10°, preferably up to 5°, preferably up to 3°, or preferably up to 2°, relative to the direction of axial displacement direction. The one-dimensional bearing can be achieved, for example, in that an articulated joint that is axially displaceable relative to a housing of the linear drive, holds the magnet. Arranging the Hall sensor in the region of the one-dimensional bearing ensures that the spacing or gap between the magnet and the Hall sensor remains constant, even in case of a pivoting and/or radial movement of the actuator and of the magnet connected thereto along the full length of displacement of the actuator. It has been surprisingly discovered that this aspect in accordance with the invention compensates the risk of the sensing results being distorted by a deflection of the actuator from the axial displacement path. The combination of a one-dimensional bearing for the movable magnet and the fixed arrangement of the Hall sensor adjacent to the magnet, as described herein, ensures that the position of a portion of the magnet in the vicinity of the Hall sensor is predefined in its movement to the Hall sensor. It has also been surprisingly discovered that embodiments of the invention provide enhanced flexibility in the design of the positioner, particularly in coupling a pneumatic servo to the positioner, because the bearing of the actuator now already makes available freedom of movement radially.

In a further embodiment, the one-dimensional bearing is configured as a slide bearing having a substantial line or punctiform bearing contact. By this arrangement, the one-dimensional bearing is a simple and friction reducing structure. Preferably the Hall sensor is arranged substantially axially level with the line bearing surface. This ensures that the spacing between the magnet and the Hall sensor remains constant over full-length displacement of the magnet.

In another further embodiment, the Hall sensor is arranged on or in a fixed, preferably sleeve-type, holding or forming holding for forming the one-dimensional bearing. The support may be secured to the housing of the linear drive or may be part of the housing itself. In this arrangement, the one-dimensional bearing may be formed by a constriction configured on the inner side of the sleeve-type support. Preferably, the constriction comprises a convex bearing contact surface for the magnet.

In one aspect, the magnet may be aligned with the longitudinal direction of the actuator and connected to the actuator by a magnet support for replicating the actuation response of the actuator. Preferably the magnet support and an actuator rod forming the actuator are made in one piece, preferably of a piece of metal. In this arrangement, the magnet support may be preferably achieved by a blind hole machined in the actuator rod for receiving the magnet.

In another preferred aspect, the magnet support is configured as an axial extension of the actuator, configured especially as a separate structural component as regards the actuator.

The magnet support may be preferably secured to the actuator, the actuator being preferably in screw attachment with the magnet support or the magnet support being elastically tensioned against the actuator. In a preferred further embodiment, the magnet support is formed by a sleeve-type keeper comprising substantially the same outer diameter as the actuator so that there is no need to change the passage openings in the housing of the linear drive for the actuator and the magnet support. The Hall sensor can be designed to generate electrical displacement signals which can be supplied to a controller via means for communicating the displacement signals.

In addition, embodiments of the invention relate to a linear drive, for example a pneumatic linear drive, such as an aneroid capsule for positioning a positioner such as a turbocharger, a turbobrake, a valve or the like. The linear drive comprises an actuator, such as an actuator rod shiftingly coupled in function to the positioner. The invention also relates to a device for sensing a linear displacement of the actuator.

Preferably, the linear drive comprises a pneumatic working chamber which is defined in part by a movable arrangement of a diaphragm and a stiffener to which the actuator is secured directly or via the magnet support for transferring driving forces.

In this arrangement, the magnet support may be rigidly secured, such as riveted to a plate-type stiffener. As an alternative, the magnet support may be movably connected via a ball cup structure to the stiffener to make available an increase in the freedom of movement for transverse deflections of the actuator.

DESCRIPTION OF THE DRAWINGS

Further advantages, properties and features of the invention are detailed in the following description of preferred embodiments of the invention with reference to the attached drawings in which.

DETAILED DESCRIPTION

Figure 1:
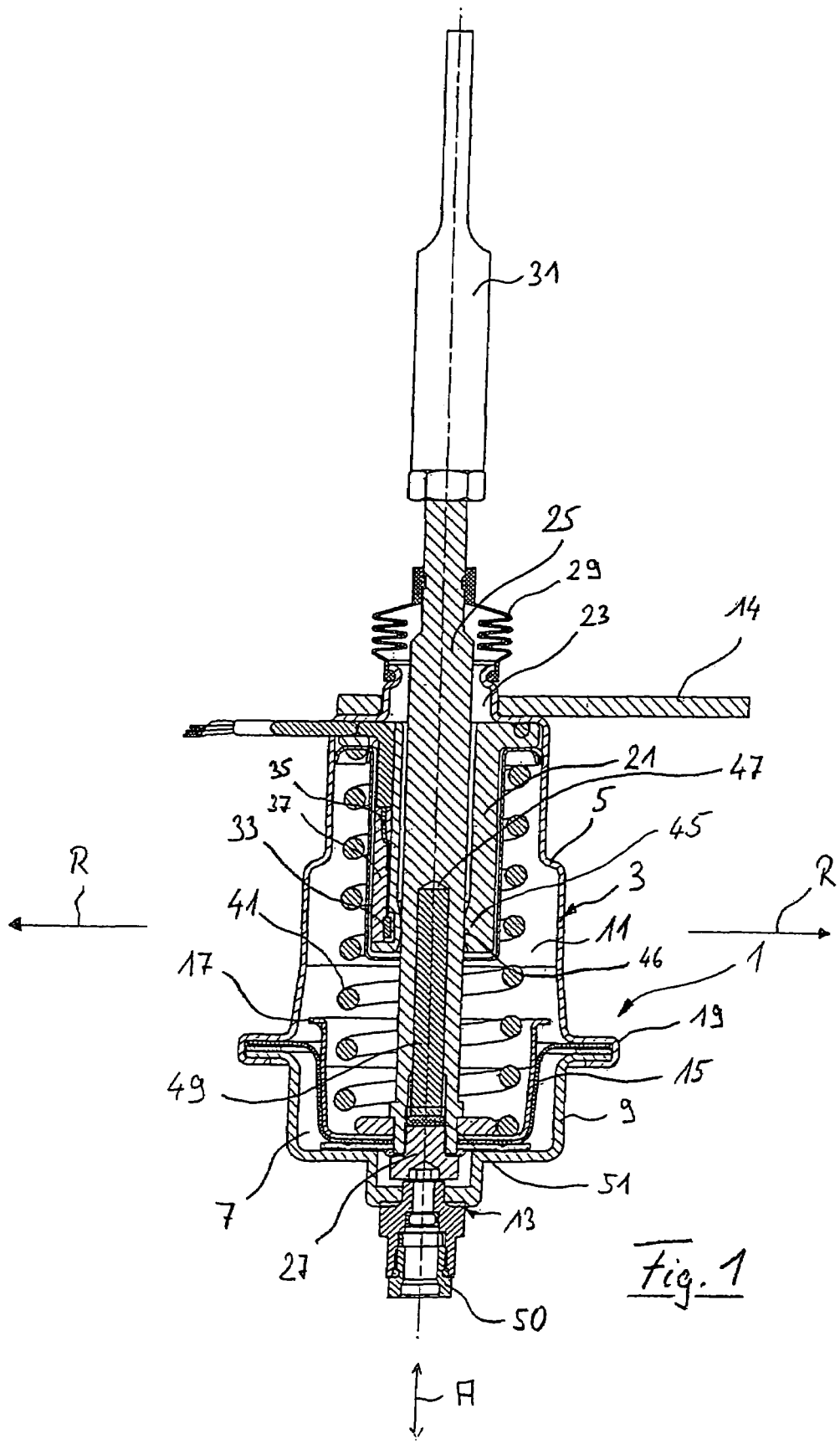
FIG. 1 is a cross-sectional view of a pneumatic linear drive in accordance with the invention in a first embodiment.
Figure 2:
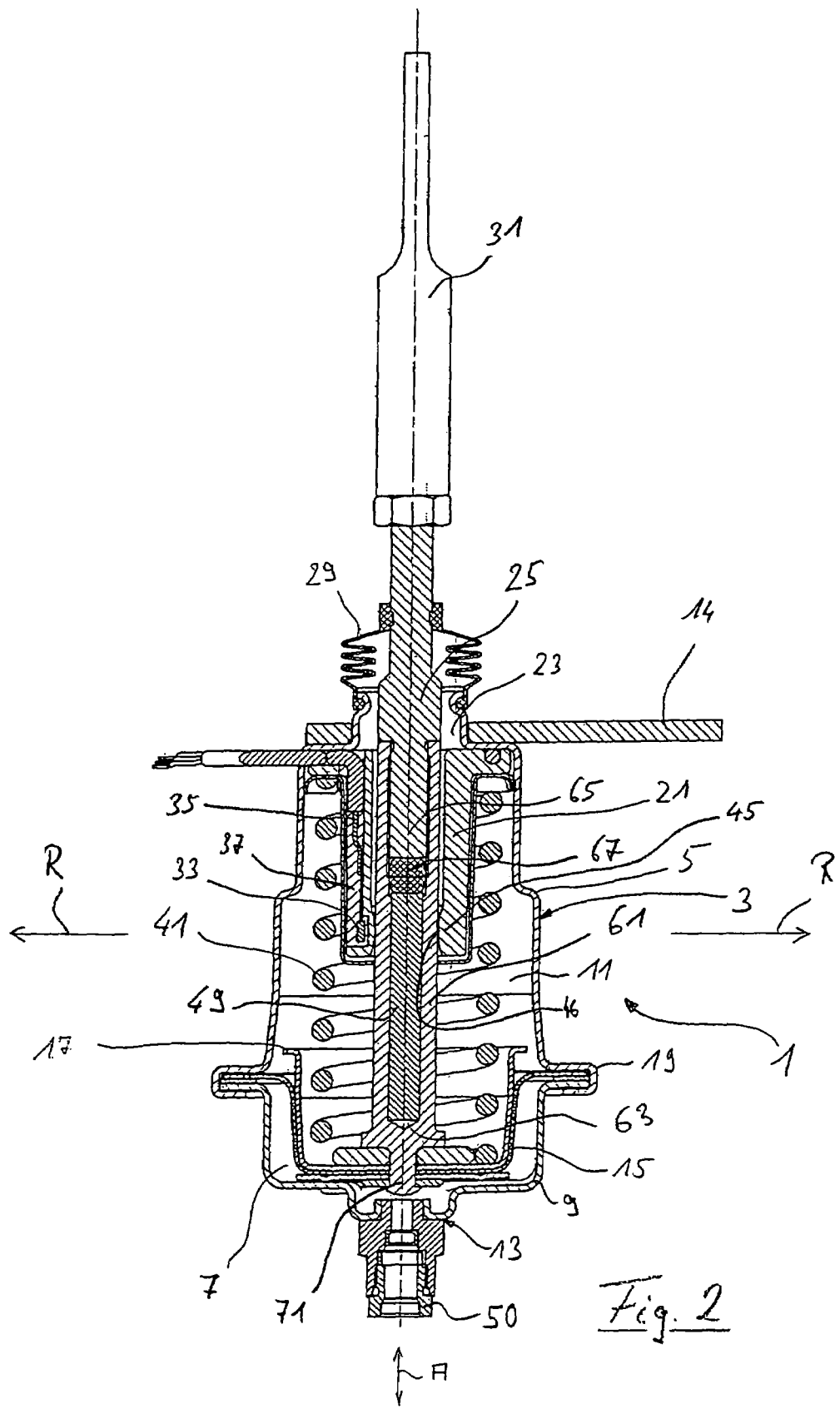
FIG. 2 is a cross-sectional view of a pneumatic linear drive in accordance with the invention in a second embodiment.
Figure 3:
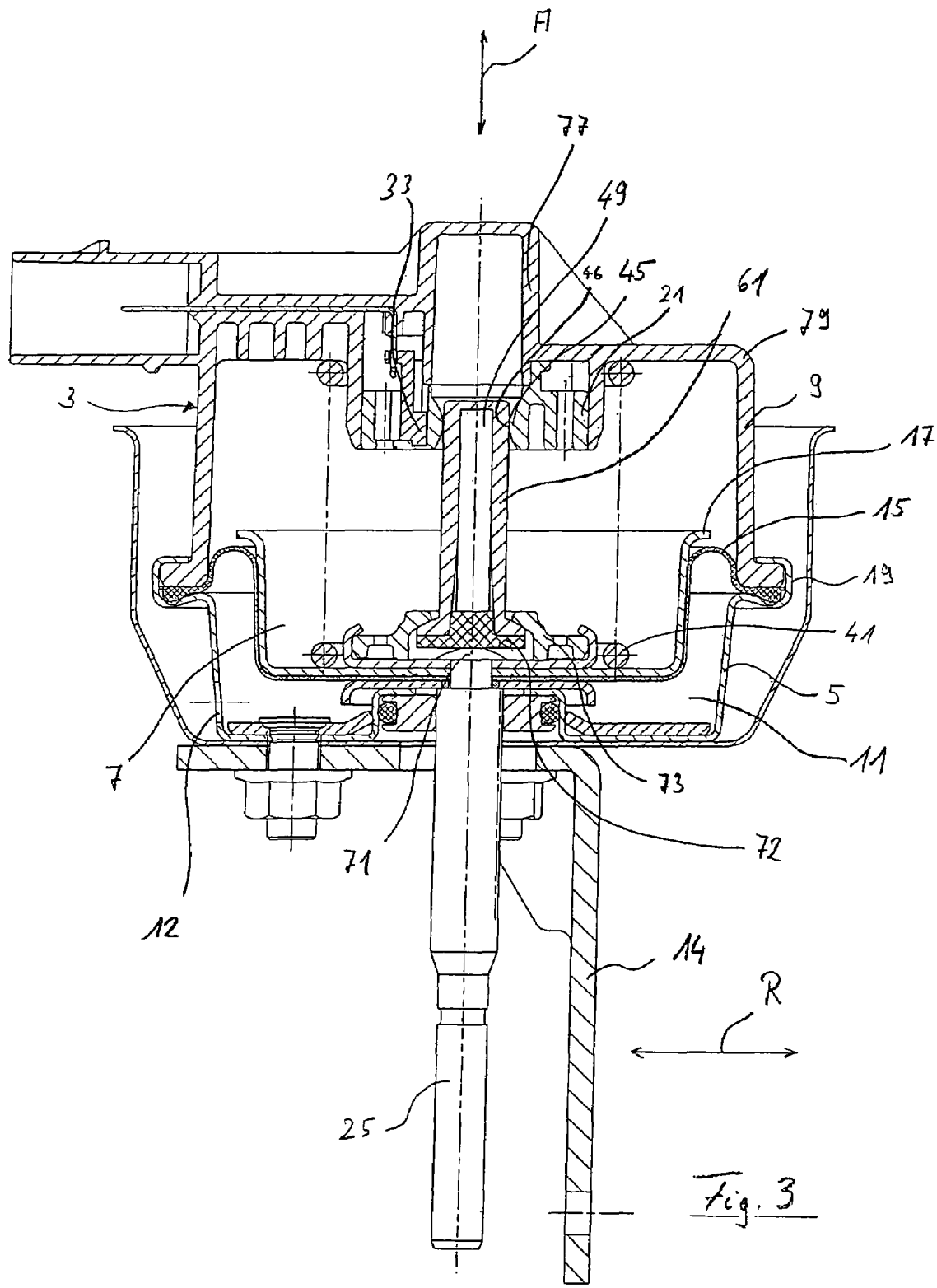
FIG. 3 is a cross-sectional view of a pneumatic linear drive in accordance with the invention in a third embodiment.

Illustrated in the FIGS. 1 to 3 are three different aspects of linear drives in accordance with the invention, each one of which comprises a device in accordance with the invention for sensing a displacement or a linear displacement sensor of an actuator. For a better understanding of the description of the FIGS. as follows, like or identical components are identified by the same reference numerals in all three aspects.

The pneumatic linear drive as shown in FIGS. 1 to 3 is configured as an aneroid capsule or pressure can 1. The aneroid capsule 1 comprises a multi-part housing 3, of which one part 5 defines a vent chamber 11, at least partially, and another part 9 of the housing 3, a pneumatic pressure or working chamber 7. Vent ports 12 are evident in FIG. 3. Provided at the housing part 9 (in accordance with the aspects as shown in FIGS. 1 and 2) is a connector 13 for connecting a source of compressed air (not shown). The housing 3 is secured to a support 14.

The pressure chamber 7 is also defined by a diaphragm 15 which is stiffened from a pot-shaped stiffener 17 arranged concentric to the diaphragm 15 centrally up to edge portions. The diaphragm 15 is secured fluid-tight at a crimp 19 to the housing 3.

In accordance with the linear drive as shown in FIGS. 1 and 2, provided at the inner side of the housing part 5 is a support configured in the form of a sleeve 21 in the region of a locating hole 23 provided in the housing part 5. Extending through the locating hole 23 is an actuator of the aneroid capsule 1 configured as the actuator rod 25. The actuator rod 25 is secured to the stiffener 17 via a screw fastener 27. The locating hole 23 is closed off by a bellows-type gaiter 29 engaging the housing part 5 as well as the actuator rod 25.

Outside of the housing 3 of the aneroid capsule 1, the actuator rod 25 is screw attached at one end to a control element 31 of a turbocharger (not shown).

The sleeve 21 comprises on the outside a recess (FIGS. 1, 2) or a cavity (FIG. 3) in which a Hall sensor 33 and, where necessary, electrical leads 35 extending therefrom. A cover 37, as a snap fit in the recess, locates the Hall sensor 33 precisely in the sleeve 21. The Hall sensor 33 is connected via electrical leads 35 to a controller (not shown).

A pressure biased coil spring 41 has the effect that the diaphragm 15 as well as the stiffener 17, are urged towards the inner side of the housing part 9 (FIGS. 1, 2) or housing part 5 (FIG. 3) and then, where necessary, maintained in an idle position of the linear drive. This idle position is shown in FIGS. 1 to 3 of the linear drive in each case.

At its end on the side of the diaphragm, the sleeve 21 comprises a rounded constriction 45 forming a convex bearing surface. The smallest inner diameter of the constriction 45 is dimensioned as compared to the outer diameter of the actuator rod 25 such that a clearance fit or loose fit for a sliding passage of the actuator rod 25 past the constriction 45 is provided.

The constriction 45 forms a one-dimensional slide bearing with line bearing contact 46 substantially surrounding the actuator rod. The slide bearing receives exclusively forces in the radial direction R in furnishing freedom of movement in the axial direction A whilst permitting pivoting movements off the longitudinal centerline (A) of the actuator rod 25 in a conical pivoting range of up to 3° by intersecting the centerline (A).

The Hall sensor 33 is arranged in the constriction 45 with the line bearing contact 46 opposing or in the sleeve 21 so that, even in a combined pivotal and pushing motion of the actuator rod 25, the spacing of the actuator rod 25 from the Hall sensor 33 remains the same.

In accordance with the aspect as shown in FIG. 1, a blind hole 47 is machined in the end of the actuator rod 25 near to the housing part 9 along the actuator rod 25 in which a cylindrical bar magnet 49 is fitted with a transitional clearance. The position of the bar magnet 49 is defined within the blind hole 47 by means of a screw fastener 27. Provided between the screw fastener 27 and the bar magnet 49 is a elastomeric adapter 51 which biases the bar magnet 49 within the blind hole 47.

In operation of the aneroid capsule 1, as shown in FIGS. 1 and 2, via a pneumatic connector 50 in the pressure chamber 7, a pressure is built up which permits axial displacement of the stiffener 17 as guided by the diaphragm 15 away from the housing part 9 in overcoming the bias of the coil spring 41. Displacement of the stiffener 17 likewise displaces the actuator rod 25 including the bar magnet 49 axially. The change in magnetic flux density associated with the displacement is sensed by the Hall sensor 33 which then generates electrical signals suitable for precisely determining the displacement positions of the actuator rod. The displacement signals are applied via electrical leads 35 to a controller (not shown) which in accordance with the signals activates a pneumatic pressure source (not shown).

If the positioner (not shown) prompts transverse deflections of the actuator rod 25, these are now admissible without fear of distorted position sensing by the Hall sensor 33 because the spacing or gap between the Hall sensor 33 and the bar magnet 49 remains constant even in case of combined translational and pivoting movements of the actuator rod 25.

The aneroid capsule 1 as shown in FIG. 2 differs substantially from the aneroid capsule 1 as shown in FIG. 1 in that a magnet support 61 is provided constructionally separate from the actuator rod 25, as can be viewed as a structural extension of the actuator rod 25. The dimension of the bar-type magnet support 61 is adapted to the actuator rod 25 so that a smooth transition exists from the actuator rod 25 to the magnet support 61. When the magnet support 61 is fitted to the actuator rod 25, the actuator rod 25 and magnet support 61 form the outer shape of the actuator rod 25 as a whole in accordance with the aspect as shown in FIG. 1.

The bar-type magnet support 61 comprises a blind hole 63 in which a bar magnet 49 is inserted with a transitional clearance. The position of the bar magnet 49 is defined by the screw attachment of the magnet support 61 with the actuator rod 25, an elastic bias members 67 for tensioning the bar magnet 49 in the blind hole 63 being provided between a stop portion 65 of the actuator rod 25 and the bar magnet 49.

An advantage of the two-part configuration of the actuator rod, namely, a first actuator rod portion (at stop portion 65) and a magnet support 61 extending the length of the actuator rod portion, is that the bar magnet 49 can be fitted via the end of the housing 3 which is insensitive in design remote from the diaphragm in being inserted into the magnet support 61. Moreover, the magnet support 61 can be secured in advance via a rivet fastener 71 to the stiffener 17 in forming a linear drive unit. The linear drive unit comprising housing 3, diaphragm/stiffener assembly, coil spring 41 and magnet support 61 can be easily fitted by inserting the actuator rod 25 into the sleeve 21 and connecting it to the positioner.

The aspect of the pneumatic linear drive as shown in FIG. 3 differs from that shown in FIGS. 1 and 2 in that the pressure chamber 7 is subjected to a vacuum and the diaphragm/stiffener assembly is located at the side of the positioner or turbocharger in the housing 3. The actuator rod 25 is connected to the stiffener 17 by a rivet fastener 71. The magnet support 61 is axially aligned with the actuator rod 25 at the rivet fastener 71 and connected to the actuator rod 25 in forming an elastic bias. The elastic bias is achieved by a elastomeric pad 72 clamped between the actuator rod 25 and the magnet support 61.

Apart from this, provided with the aneroid capsule 1 as shown in FIG. 3 is a ball socket 73 which provides an articulated joint between the magnet support 61 and the actuator rod 25. The magnet support 61 is mounted in a constriction 75 one-dimensionally so that bearing forces are exclusively communicated in the radial direction R whilst permitting a displacement in the axial direction A as well as pivoting of the magnet support 61 in a conical pivoting range of up to 2°, in this example, without changing the spacing of the bar magnet 49 arranged in the magnet support 61 from the Hall sensor 33.

The sleeve 21 with its constriction 45 is secured on the inner side to a sleeve-type supporting portion 77 of the housing part 9. The combination of a one-dimensional bearing at the constriction 45 and articulated joint of the magnet support 61 with the actuator rod 25 via the ball socket 73 permits considerable deflections of the actuator rod 25 in the radial direction R without distorting the results sensed by the linear displacement sensor for controlling the position of the actuator rod 25.

Thus, a linear drive for positioning a positioner according to at least one embodiment may comprise an actuator operatively coupled to the positioner and a device for sensing a linear displacement of the actuator in its axial direction. The sensing device may comprise a movable, elongated magnet and a fixed Hall sensor, wherein the magnet is coupled to the actuator for moving in accordance to an actuation of the actuator. A one-dimensional bearing is provided for the magnet and is designed to receive bearing forces in a direction radial to the axial direction. This permits a guided displacement and pivoting movement of the magnet. The Hall sensor is arranged adjacent to the one-dimensional bearing.

The linear drive may further include a pneumatic working chamber defined in part by a movable arrangement of a diaphragm and a stiffener to which the actuator is secured, directly or via the magnet support, for communicating driving forces. The magnet support may be movably connected via a ball cup structure to the stiffener.

In one aspect, the one-dimensional bearing may be configured as a slide bearing having a substantially line or punctiform bearing contact. Additionally, the Hall sensor may be arranged substantially axially level with the line bearing contact. The Hall sensor may also be arranged on or in a fixed sleeve-type support holding the one-dimensional bearing. In another aspect, the one-dimensional bearing may be formed by a constriction configured on the inner side of the sleeve-type support. The constriction, in one embodiment, may comprise a convex bearing surface for the magnet or a magnet support.

The magnet may be aligned with a longitudinal direction of the actuator and further connected to the actuator via a magnet support for replicating the actuation of the actuator. The magnet support and an actuator rod forming the actuator can be made in one piece, the magnet support being achieved by a blind hole provided in the actuator rod for receiving the magnet. The magnet support may be configured as an axial extension of the actuator. The magnet support may also be secured to the actuator, particularly by means of a screw attachment or is elastically tensioned with the actuator. In some embodiments, the magnet support may be formed by a sleeve-type keeper comprising substantially the same outer diameter as the actuator.

Desirably, the Hall sensor may generate electrical displacement signals. As described herein, means are provided for communicating the displacement signals to a controller, such as by wired or wireless communication.

It is understood that the features disclosed in the above description, in the figures provided herewith, and as claimed may be of significance both singly and in any combination for achieving the invention in the various aspects thereof. The scope of the invention should therefore be determined, not based on the precise forms and illustrations described herein, but from the following claims and equivalents thereto.

What is claimed is:

1. A device for sensing a displacement of an actuator in a linear drive that substantially linearly displaces the actuator in its axial direction, the device comprising a movable, elongated magnet and a fixed Hall sensor, the magnet being physically coupled to the actuator for moving in accordance to an actuation of the actuator, wherein a one-dimensional bearing is provided for the magnet and is designed to receive bearing forces in a direction radial to the axial direction in permitting a guided displacement and pivoting movement of the magnet, and wherein the Hall sensor is arranged adjacent to the one-dimensional bearing.

2. The device as set forth in claim 1, wherein the magnet is aligned with a longitudinal direction of the actuator and is connected to the actuator via a magnet support for replicating the actuation of the actuator.

3. The device as set forth in claim 2, wherein the magnet support and an actuator rod forming the actuator are made in one piece, the magnet support being achieved by a blind hole provided in the actuator rod for receiving the magnet.

4. The device as set forth in claim 2, wherein the magnet support is configured as an axial extension of the actuator.

5. The device as set forth in claim 2, wherein the magnet support is secured to the actuator, particularly by means of a screw attachment or is elastically tensioned with the actuator.

6. The device as set forth in claim 2, wherein the magnet support is formed by a sleeve-type keeper comprising substantially the same outer diameter as the actuator.

7. The device as set forth in claim 1, wherein the Hall sensor generates electrical displacement signals, and a means for communicating the displacement signals to a controller is provided.

8. A device for sensing a displacement of an actuator in a linear drive that substantially linearly displaces the actuator in its axial direction, the device comprising a movable, elongated magnet and a fixed Hall sensor, the magnet being coupled to the actuator for moving in accordance to an actuation of the actuator, wherein a one-dimensional bearing is provided for the magnet and is designed to receive bearing forces in a direction radial to the axial direction in permitting a guided displacement and pivoting movement of the magnet, and wherein the Hall sensor is arranged adjacent to the one-dimensional bearing, wherein the one-dimensional bearing is configured as a slide bearing having a substantially line or punctiform bearing contact.

9. The device as set forth in claim 8, wherein the Hall sensor is arranged substantially axially level with the line bearing contact.

10. A device for sensing a displacement of an actuator in a linear drive that substantially linearly displaces the actuator in its axial direction, the device comprising a movable, elongated magnet and a fixed Hall sensor, the magnet being coupled to the actuator for moving in accordance to an actuation of the actuator, wherein a one-dimensional bearing is provided for the magnet and is designed to receive bearing forces in a direction radial to the axial direction in permitting a guided displacement and pivoting movement of the magnet, and wherein the Hall sensor is arranged adjacent to the one-dimensional bearing, wherein the Hall sensor is arranged on or in a fixed sleeve-type support holding the one-dimensional bearing.

11. The device as set forth in claim 10, wherein the one-dimensional bearing is formed by a constriction configured on the inner side of the sleeve-type support.

12. The device as set forth in claim 11, wherein the constriction comprises a convex bearing surface for the magnet or a magnet support.

13. A linear drive for positioning a positioned comprising:
an actuator operatively coupled to the positioned; and
a device for sensing a linear displacement of the actuator in its axial direction, the device comprising a movable, elongated magnet and a fixed Hall sensor, the magnet being physically coupled to the actuator for moving in accordance to an actuation of the actuator, wherein a one-dimensional bearing is provided for the magnet and is designed to receive bearing forces in a direction radial to the axial direction in permitting a guided displacement and pivoting movement of the magnet, and wherein the Hall sensor is arranged adjacent to the one-dimensional bearing.

14. The linear drive as set forth in claim 13 wherein a pneumatic working chamber is further defined in part by a movable arrangement of a diaphragm and a stiffener to which the actuator is secured, directly or via the magnet support, for communicating driving forces.

15. The linear drive as set forth in claim 14, wherein the magnet support is movably connected via a ball cup structure to the stiffener.

16. The linear drive as set forth in claim 13, wherein the one-dimensional bearing is configured as a slide bearing having a substantially line or punctiform bearing contact.

17. The linear drive as set forth in claim 16, wherein the Hall sensor is arranged substantially axially level with the line bearing contact.

18. The linear drive as set forth in claim 13, wherein the Hall sensor is arranged on or in a fixed sleeve-type support holding the one-dimensional bearing.

19. The linear drive as set forth in claim 18, wherein the one-dimensional bearing is formed by a constriction configured on the inner side of the sleeve-type support.

20. The linear drive as set forth in claim 19, wherein the constriction comprises a convex bearing surface for the magnet or a magnet support.

* * * * *

UNITED STATES PATENT AND TRADEMARK OFFICE
CERTIFICATE OF CORRECTION

PATENT NO.        : 7,423,421 B2  
APPLICATION NO.   : 11/357433  
DATED             : September 9, 2008  
INVENTOR(S)       : U. Reichert et al.

Page 1 of 1

It is certified that error appears in the above-identified patent and that said Letters Patent is hereby corrected as shown below:

| COLUMN | LINE | ERROR |
|---|---|---|
| 8 (Claim 13, line 1) | 4 | "positioned" should read --positioner-- |
| 8 (Claim 13, line 2) | 5 | "positioned" should read --positioner-- |

Signed and Sealed this

Fifth Day of May, 2009

JOHN DOLL  
*Acting Director of the United States Patent and Trademark Office*